(12) United States Patent
Dekel et al.

(10) Patent No.: US 7,839,402 B2
(45) Date of Patent: Nov. 23, 2010

(54) VIRTUAL ENDOSCOPY

(75) Inventors: Doron Dekel, Toronto (CA); Jacob S. Durgan, Willoughby Hills, OH (US); Thorsten R. Fleiter, Cleveland Heights, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 887 days.

(21) Appl. No.: 11/577,560

(22) PCT Filed: Jun. 2, 2005

(86) PCT No.: PCT/IB2005/051810

§ 371 (c)(1),
(2), (4) Date: Apr. 19, 2007

(87) PCT Pub. No.: WO2006/000925

PCT Pub. Date: Jan. 5, 2006

(65) Prior Publication Data

US 2008/0055308 A1    Mar. 6, 2008

Related U.S. Application Data

(60) Provisional application No. 60/582,120, filed on Jun. 23, 2004, provisional application No. 60/582,122, filed on Jun. 23, 2004, provisional application No. 60/620,581, filed on Oct. 20, 2004.

(51) Int. Cl.
G06T 15/40 (2006.01)

(52) U.S. Cl. .................. 345/421; 345/419; 345/420; 345/424; 345/620; 382/128; 382/154; 600/103; 600/407; 600/431; 600/443

(58) Field of Classification Search .......... 345/419, 345/420, 424, 620, 421, 426; 382/128, 154; 128/922; 348/38; 600/103, 407
See application file for complete search history.

(56) References Cited

U.S. PATENT DOCUMENTS

| | | | |
|---|---|---|---|
| 5,611,025 A | 3/1997 | Lorensen et al. | |
| 5,782,762 A | 7/1998 | Vining | |
| 5,920,319 A | 7/1999 | Vining et al. | |
| 6,083,162 A | 7/2000 | Vining | |
| 6,212,420 B1 * | 4/2001 | Wang et al. | 600/407 |
| 6,272,366 B1 | 8/2001 | Vining | |

(Continued)

FOREIGN PATENT DOCUMENTS

EP    0919956 A2    6/1999

OTHER PUBLICATIONS

Bartz "Virtual Endoscopy in Research and Clinical Practice", Eurographics 2003.*

(Continued)

*Primary Examiner*—Kimbinh T Nguyen

(57) ABSTRACT

In a virtual endoscopy method, an unfolding axis (100, 100') substantially along an elongated lumen (150) is divided into axis segments (110). Ray casting directions (104) are selected extending generally radially from the axis segments. At least some of the ray casting directions are tilted away from a camera position (102). Ray casting is performed along the tilted ray casting directions to define pixel values that are arranged into an unfolded view. The ray casting employs at least one of (i) volume rendering and (ii) computing a statistical characteristic of voxels (238) over a preselected distance (dinterval) along the ray casting direction into the lumen-defining structure.

20 Claims, 13 Drawing Sheets

U.S. PATENT DOCUMENTS

Figure 1:
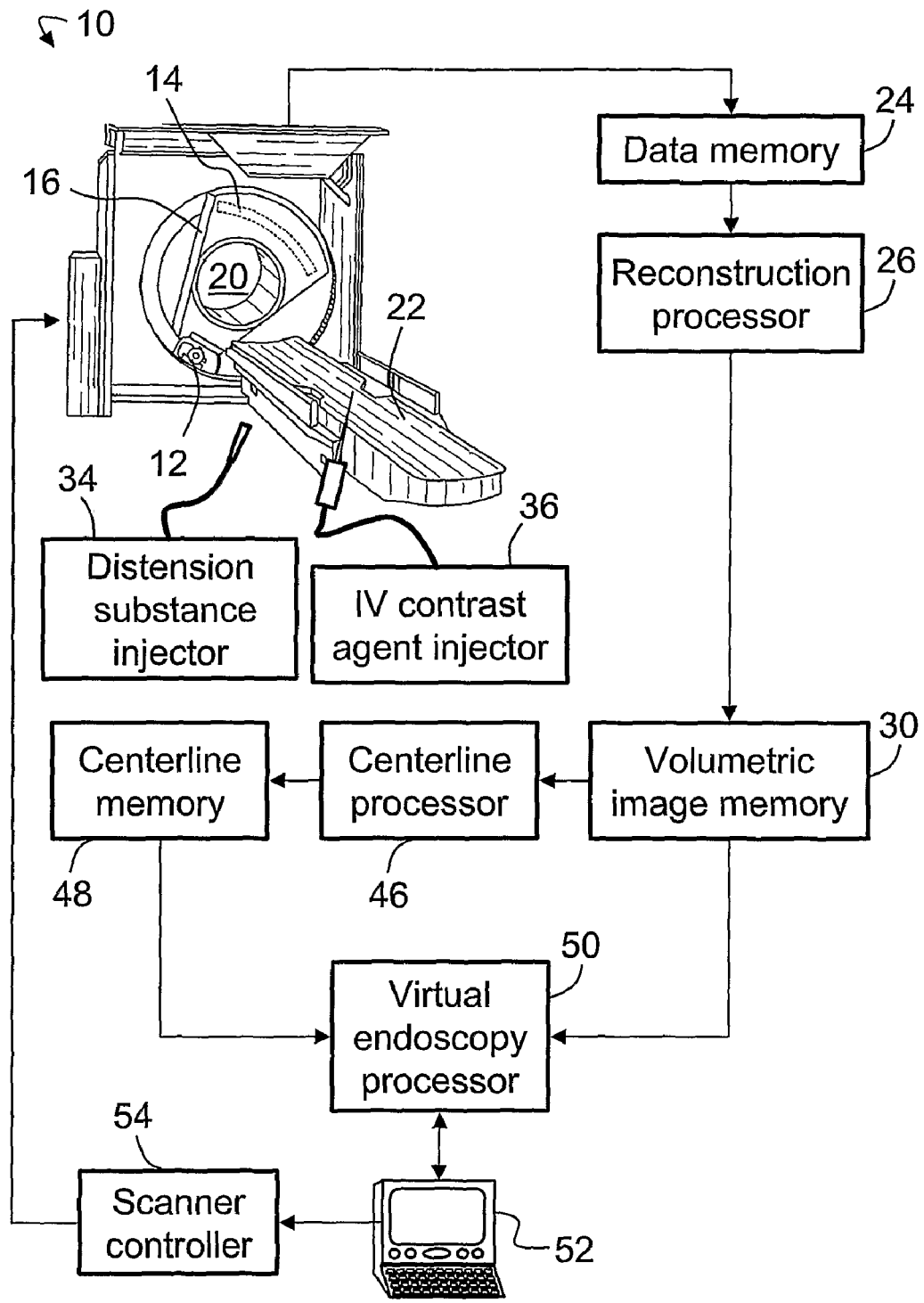

| | | | |
|---|---|---|---|
| 6,331,116 B1 | 12/2001 | Kaufman et al. | |
| 6,343,936 B1 | 2/2002 | Kaufman et al. | |
| 6,366,800 B1 | 4/2002 | Vining et al. | |
| 6,369,812 B1 | 4/2002 | Iyriboz et al. | |
| 6,694,163 B1 | 2/2004 | Vining | |
| 6,696,263 B1 | 2/2004 | Luo et al. | |
| 6,928,314 B1* | 8/2005 | Johnson et al. | 600/407 |
| 7,081,088 B2* | 7/2006 | Geiger | 600/103 |
| 7,211,046 B2* | 5/2007 | Deller et | 600/443 |
| 7,372,988 B2* | 5/2008 | Yoakum-Stover et al. | 382/154 |
| 7,574,247 B2* | 8/2009 | Moreau-Gobard et al. | 600/407 |
| 7,609,910 B2* | 10/2009 | Geiger et al. | 382/276 |
| 7,640,050 B2* | 12/2009 | Glenn et al. | 600/407 |
| 2003/0152897 A1* | 8/2003 | Geiger | 434/262 |
| 2005/0018888 A1 | 1/2005 | Zonneveld | |
| 2005/0107695 A1* | 5/2005 | Kiraly et al. | 600/431 |

OTHER PUBLICATIONS

Bartz, D. et al.; Virtual Endoscopy System for the Planning of Endoscopic Interventions in the Ventricular System inside of the Human Brain; 1999; SOUE/BiOS 1999 Conference Proceedings.

Beaulieu, C. F., et al.; Display Modes for CT Colonography; 1999; Radiology; 212(1)203-212.

Fuchs, H., et al.; Interactive, Richly Cued Shaded Display of Multiple 3D Objects in Medical Images; 1988; SPIE;914:842-849.

Haker, S., et al.; Nondistorting Flattening Maps and the 3D Visualization of Colon CT Images; 2001.

Hoehne, K. H., et al.; Combined surface display and reformatting for the three-dimensional analysis of tomographic data; 1987; Invest. Radiology; 22:658-664.

Hoffman, K. R., et al.; Visualization and navigation techniques in CT colonography; 2001.

Raman, R., et al.; Curved-slab maximum intensity projection: method and evaluation; 2003; Radiology; 229:255-260.

Ramaswamy, K., et al.; Endoscopic exploration and measurement in 3D radiological images; 1996; SPIE Medical Imaging-Image Processing.

Robb, R. A.; Virtual (Computed) Endoscopy: Development and Evaluation Using the Visible Human Datasets; 1996; Visible Human Project Conference.

Robb, R. A., et al.; Interactive 3-D image display and analysis; 1988; SPIE-Hybrid Image and Signal Processing; 939:173-202.

Summers, R. M., et al.; Automated Polyp Detection at CT Colonography: Feasibility Assessment in a Human Population; 2001; Radiology; 219(1)51-59.

Vining, D. J., et al.; Technical Feasibility of Colon Imaging with Helical CT and Virtual Reality; 1994; Annual Meeting of American Roentgen Ray Society; Abstract.

Wan, M., et al.; Volume Rendering Based Interactive Navigation within the Human Colon; 1999; IEEE-Visualization; pp. 397-400; p. 549.

Wang, G., et al.; GI Tract Unraveling with Curved Cross Sections; 1998; IEEE Trans. On Medical Imaging; 17(2) 318-322.

Wang, G., et al.; CI Tract Unraveling in Volumetric CT; 1996; Visualization in Biomedical Computing; pp. 1-12.

\* cited by examiner

VIRTUAL ENDOSCOPY

CROSS REFERENCE TO RELATED APPLICATIONS

This application claims the benefit of U.S. provisional application Ser. No. 60/620,581 filed Oct. 20, 2004, which is incorporated herein by reference.

The following relates to the medical imaging arts. It finds particular application in virtual colonoscopy employing volumetric images of the colon generated by computed tomography, magnetic resonance imaging, or the like, and will be described with particular reference thereto. More generally, it finds application in virtual endoscopy of substantially any lumen structure, such as the bladder, a blood vessel, a trachea, intestine, or other organ, and in virtual endoscopy of other confined spaces both organic and non-organic, and can employ volumetric images of the organ or confined space of interest generated by substantially any suitable imaging technique.

Virtual endoscopy employs a medical imaging system such as a computed tomography scanner or a magnetic resonance scanner to acquire a three-dimensional image of a lumen-defining structure of interest, such as a colon. The virtual image is segmented to identify the lumen-defining surface, and processed to provide a perspective view of the lumen-defining surface from the vantage of a camera disposed inside the lumen. Thus, the virtual endoscope simulates the view which is provided by a physical endoscopic camera inserted into the lumen of the colon, and which is familiar to medical personnel who are used to performing colonoscopies with a physical endoscopic camera.

Moreover, virtual endoscopic processing can overcome some of the disadvantages of conventional endoscopy. One advantage is elimination of the physical endoscopic camera, whose insertion into body cavities of human patients can be discomforting. In virtual endoscopy, imaging by computed tomography, magnetic resonance imaging, or the like is used in place of the endoscopic camera. Hence, virtual endoscopy can probe lumen-defining structures in which the lumen is inaccessible from outside of the structure. Similarly, virtual endoscopy can probe a lumen-defining structure in which the lumen contains a gas, liquid, or solid substance, where that substance is distinguishable from (that is, can be segmented from) the surrounding lumen-defining structure in the acquired volumetric image.

The limited field of view provided by the perspective of a conventional endoscopic camera is addressed in some virtual endoscopy implementations by providing an unfolded view, sometimes called a "filet" view, of the colon lumen. Conceptually, the unfolded or filet view corresponds to slicing one side of the colon longitudinally and unwrapping or unrolling the colon at the cut to form a two-dimensional surface.

However, existing unfolded views introduce undesirable distortions into the rendered surface of the colon. These distortions also make the unfolded view poorly suited for close inspection of suspected polyps. Existing unfolded views generally do not overcome another problem present in both conventional and virtual endoscopy, namely the obscuring of lesions, polyps, and other features of interest by the folded or otherwise high-relief morphology of the lumen-defining surface. Typically at least two passes, one looking forward and one looking backward, are needed to see both sides of the folds. Often, movement through the colon is stopped at various locations and the viewing origin and angle are changed to "look around" at a region of concern. Still further, existing conventional and virtual endoscopy techniques generally do not provide depth information; rather, only the surface structure and orientation is indicated.

The following contemplates improved apparatuses and methods that overcome the aforementioned limitations and others.

According to one aspect, a virtual endoscopy method is provided for performing virtual endoscopy on a volumetric image of a lumen-defining structure having an elongated lumen. An unfolding axis is determined that is substantially within the elongated lumen. A camera position is selected at a location along the unfolding axis. The unfolding axis is divided into axis segments. Ray casting directions are selected extending generally radially from the axis segments of the unfolding axis. At least some of the ray casting directions are tilted away from the camera position based on distance between the corresponding axis segment and the camera position. Ray casting is performed along the tilted ray casting directions to define pixel values. The pixel values are arranged into an unfolded view.

According to another aspect, a virtual endoscopy method is provided for performing virtual endoscopy on a volumetric image of a lumen-defining structure. Ray casting directions are selected extending toward a lumen-defining surface of the lumen-defining structure. A statistical characteristic of voxels is computed over a preselected distance ($d_{interval}$) along each ray casting direction into the lumen-defining structure. A pixel value is determined for each ray casting direction based at least on the computed statistical characteristic. The pixel values are arranged into an endoscopic view of the lumen-defining structure.

One advantage resides in reduced distortion in the unfolded view.

Another advantage resides in rendering distortion more intuitive so it can be used to advantage.

Another advantage resides in providing depth information in the virtual endoscopic views.

Another advantage resides in an improved user interface for inspecting suspected lesions, polyps, or other features of interest.

Yet another advantage resides in reduces obscuring of features of interest by folds or other high relief morphology of the lumen-defining surface.

Numerous additional advantages and benefits will become apparent to those of ordinary skill in the art upon reading the following detailed description.

The invention may take form in various components and arrangements of components, and in various process operations and arrangements of process operations. The drawings are only for the purpose of illustrating preferred embodiments and are not to be construed as limiting the invention.

FIG. 1 diagrammatically shows a virtual endoscopy system.

Figure 2:
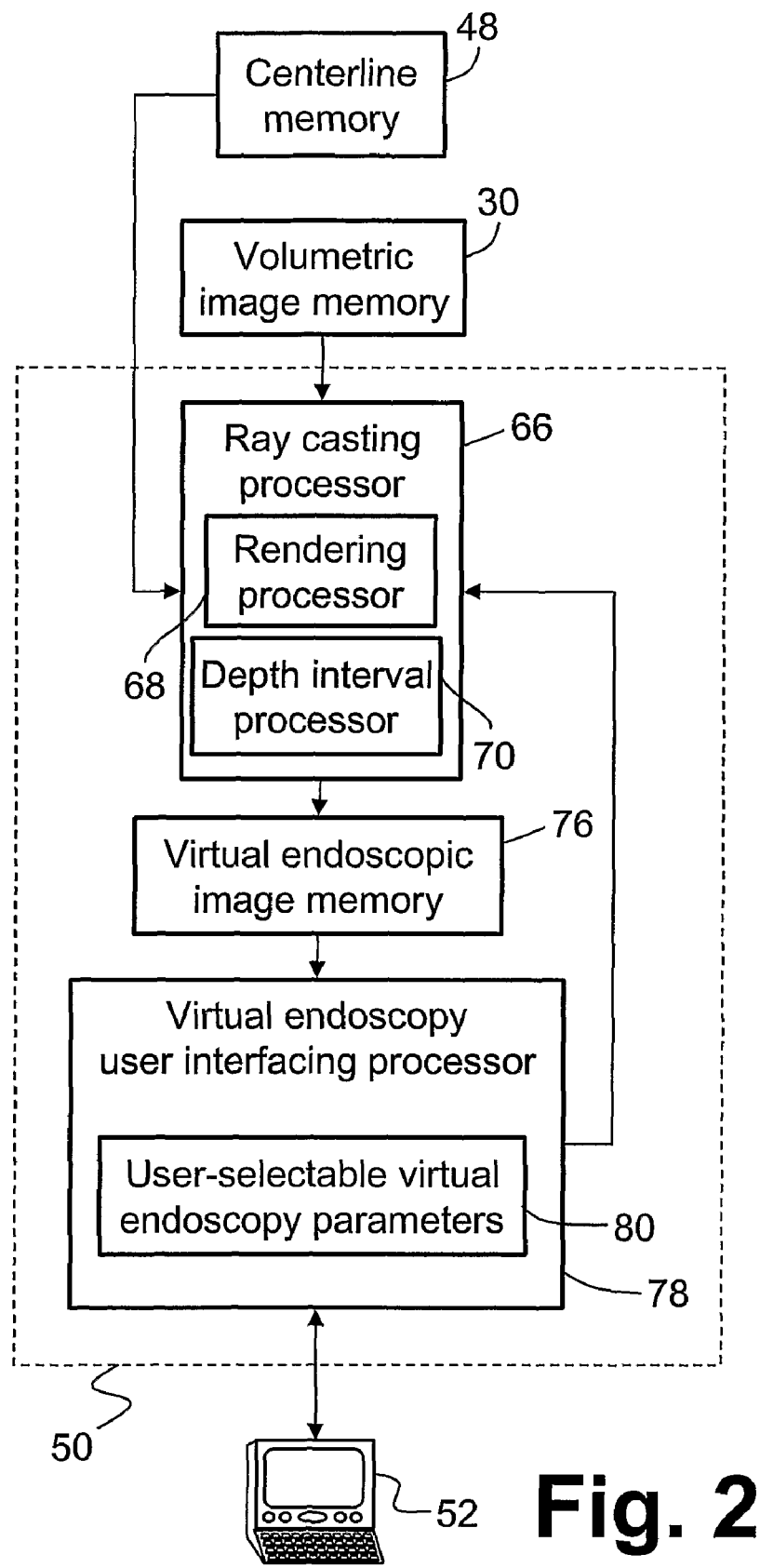

FIG. 2 diagrammatically shows the virtual endoscopy processor of the virtual endoscopy system of FIG. 1.

Figure 3:
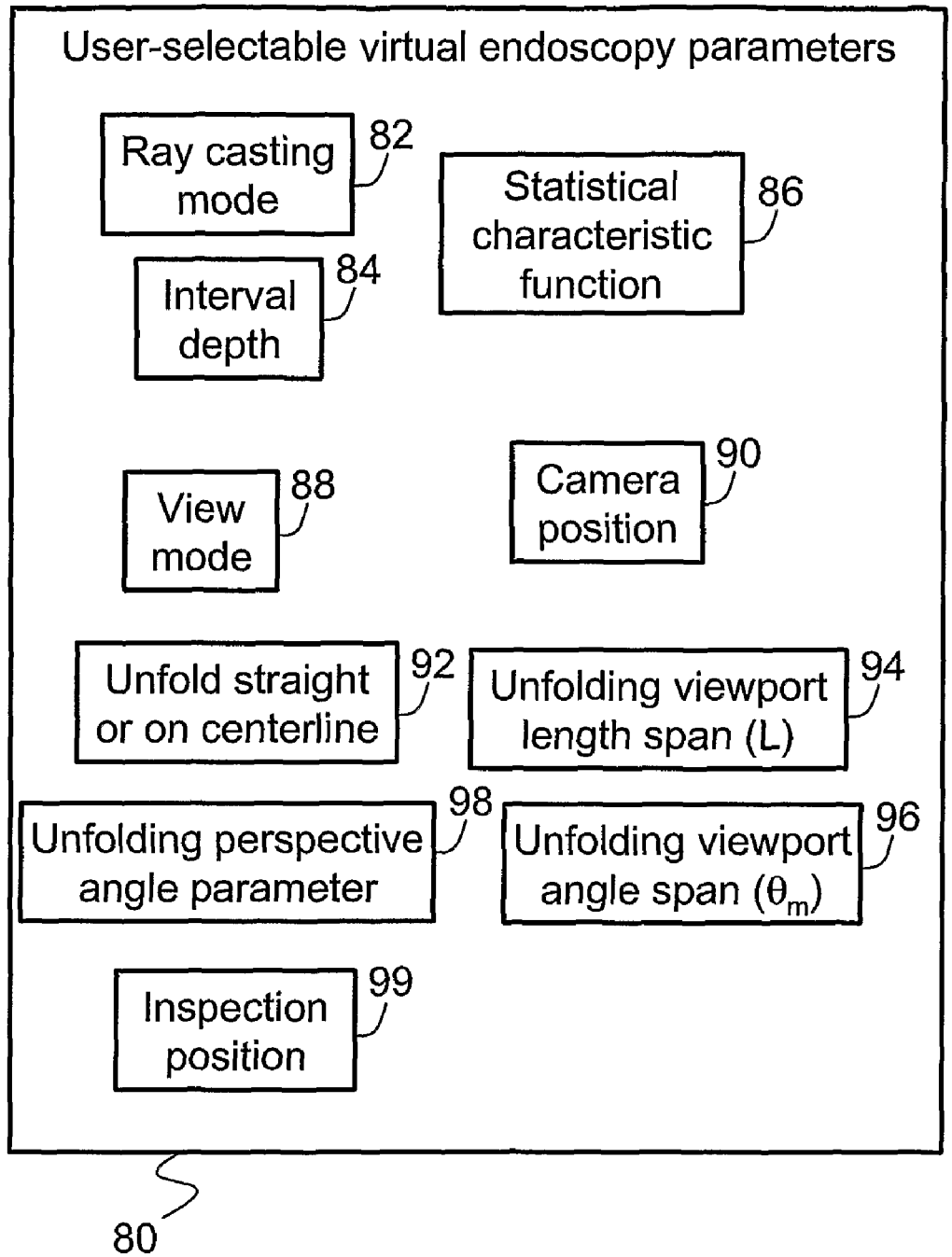

FIG. 3 diagrammatically shows user-selectable virtual endoscopy parameters.

Figure 4A:
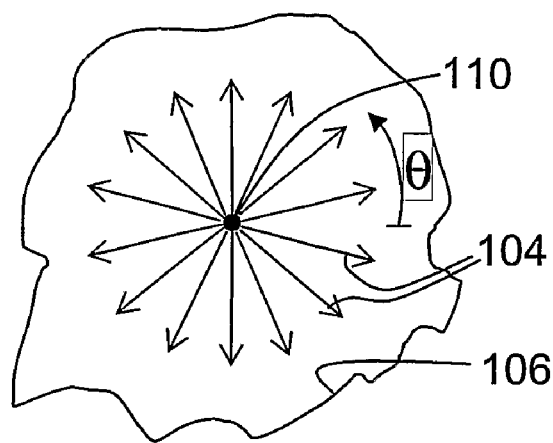

FIG. 4A diagrammatically shows an end view of an unfolding axis segment including ray casting directions indicated by arrows.

Figure 4B:
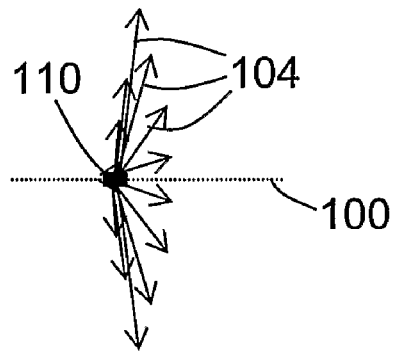

FIG. 4B diagrammatically shows a perspective view of an unfolding axis segment including ray casting directions indicated by arrows.

Figure 4C:
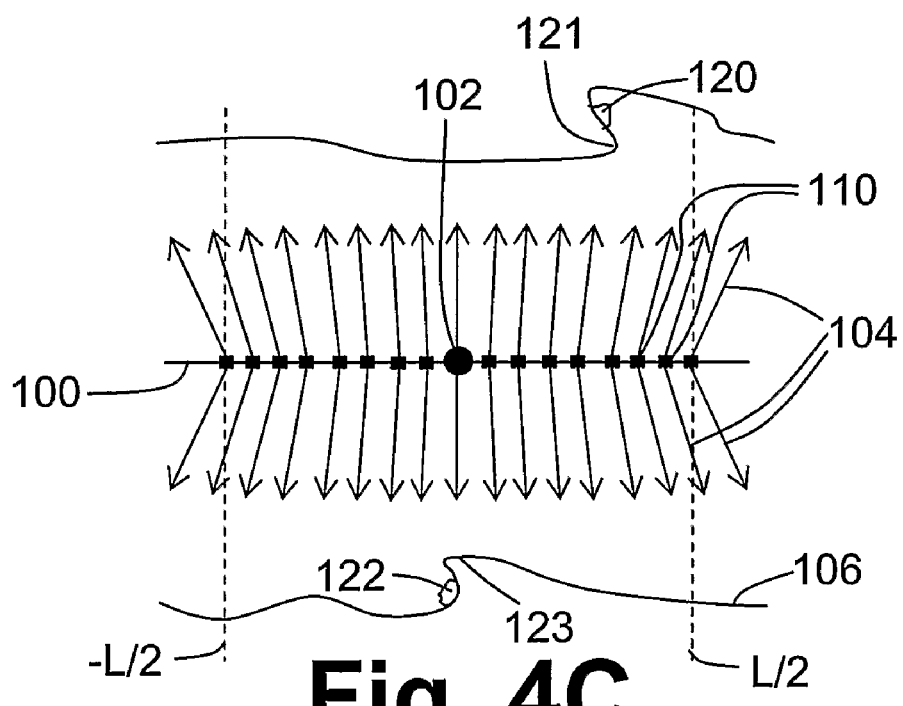

FIG. 4C diagrammatically shows a side view of the unfolding axis including ray casting directions indicated by arrows.

Figure 4D:
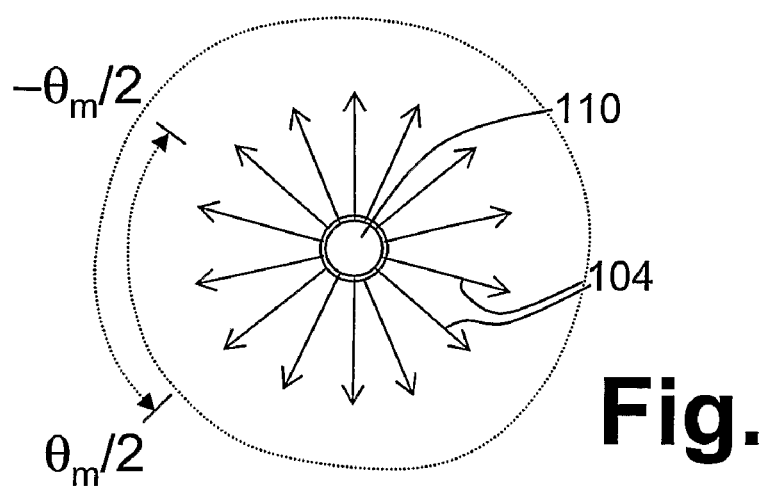

FIG. 4D diagrammatically shows the unwrapping or unrolling of the unfolded view over an angular span $\theta_m$ that is optionally greater than 360°.

Figure 4E:
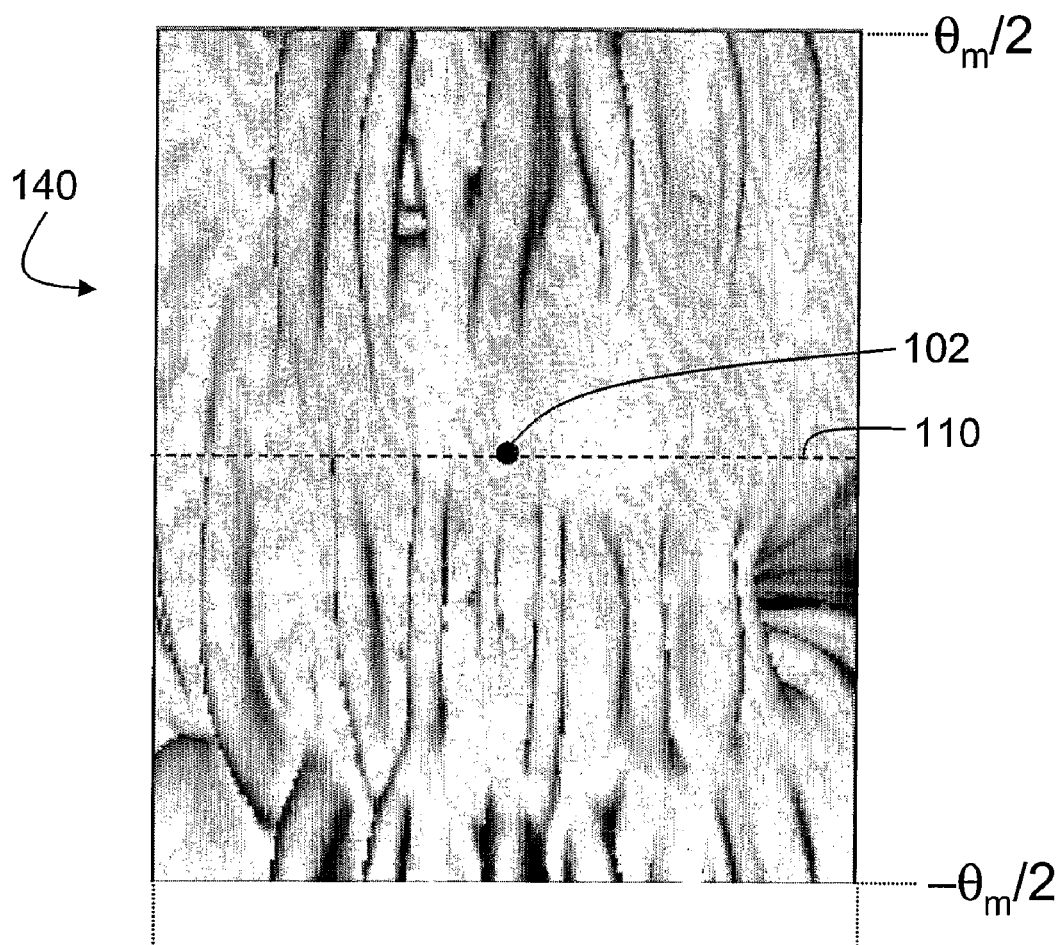

FIG. 4E shows a rendering of a portion of a colon surface using the unfolded or filet view.

Figure 4F:
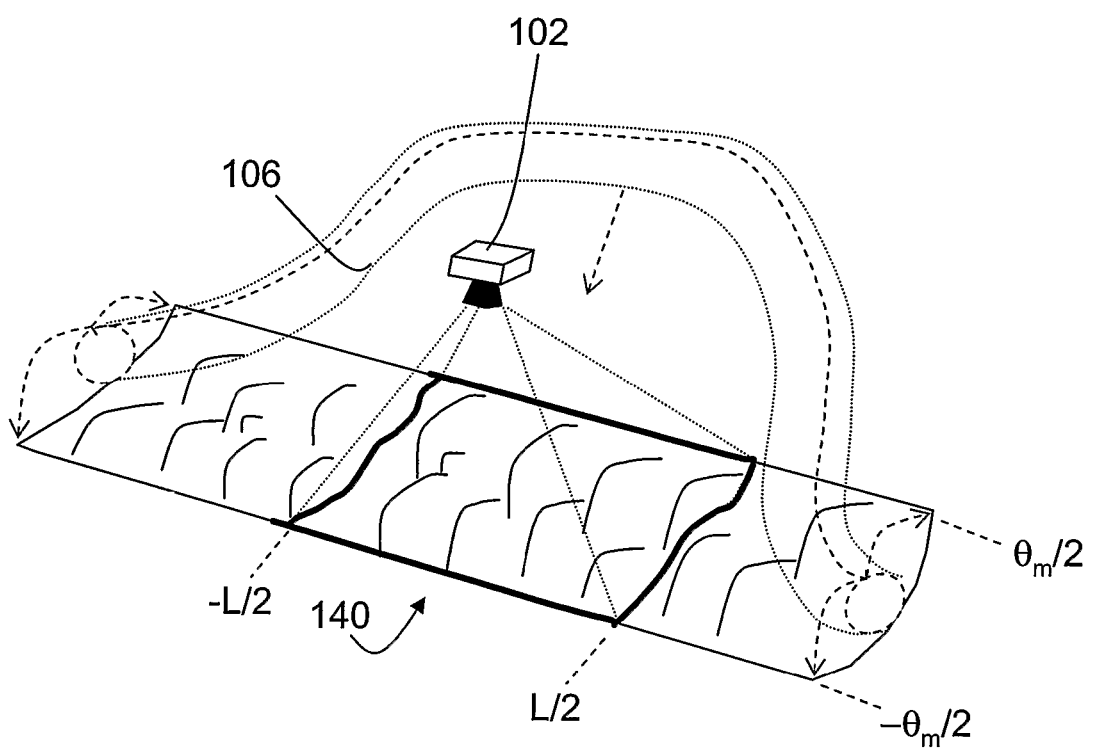

FIG. 4F diagrammatically shows the perspective effect achieved by tilting of the ray casting directions in the unfolded view.

Figure 5A:
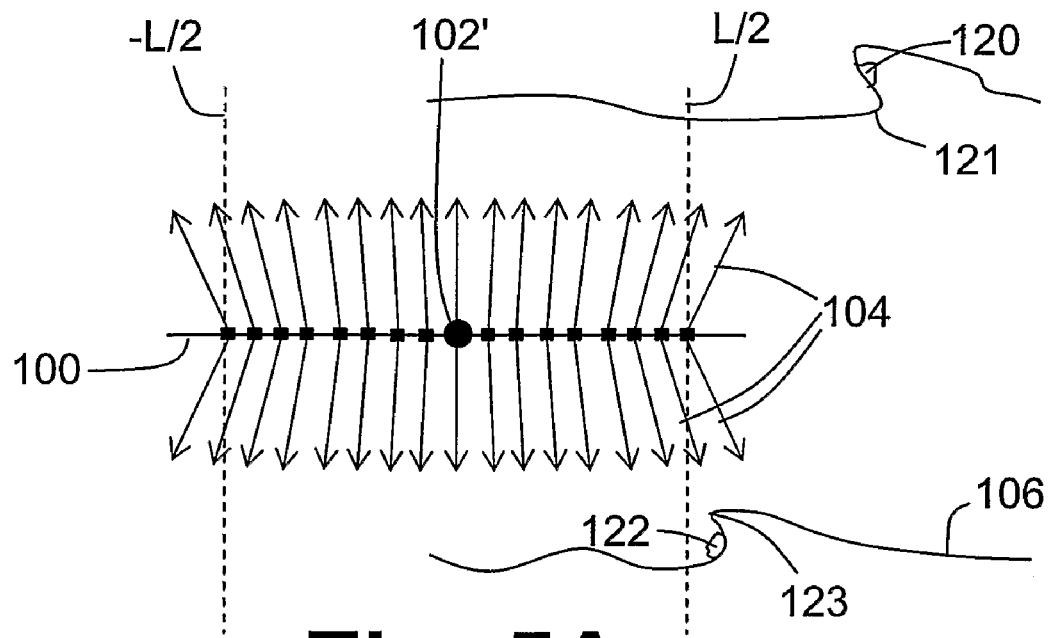

FIG. 5A diagrammatically shows a side view of the unfolding axis including ray casting directions and the surrounding lumen-defining surface, where the camera position has been shifted along a lumen centerline.

Figure 5B:
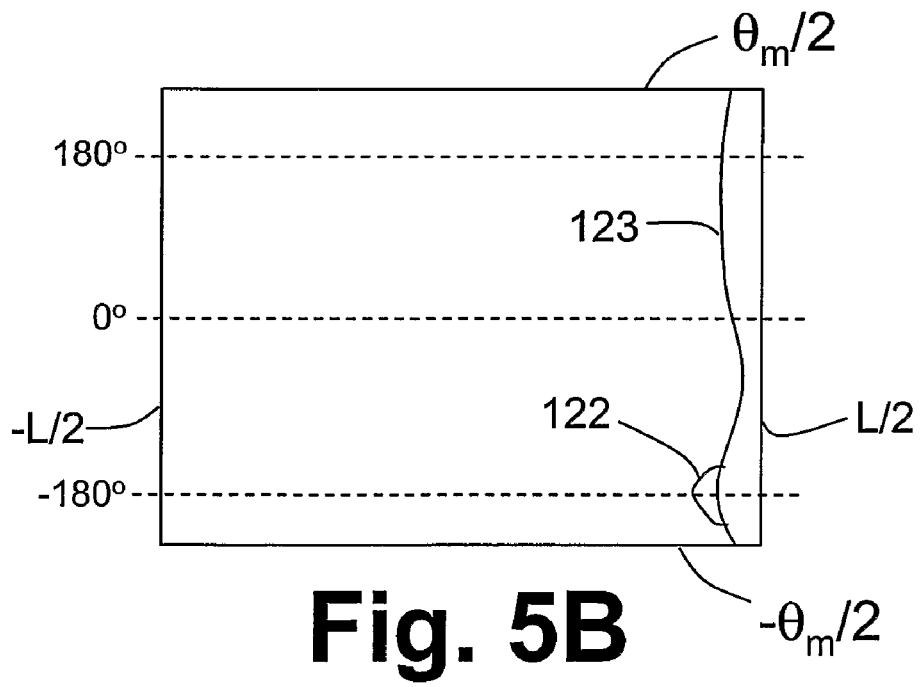

FIG. 5B diagrammatically shows the unfolded view obtained in the camera position of FIG. 5A.

Figure 6A:
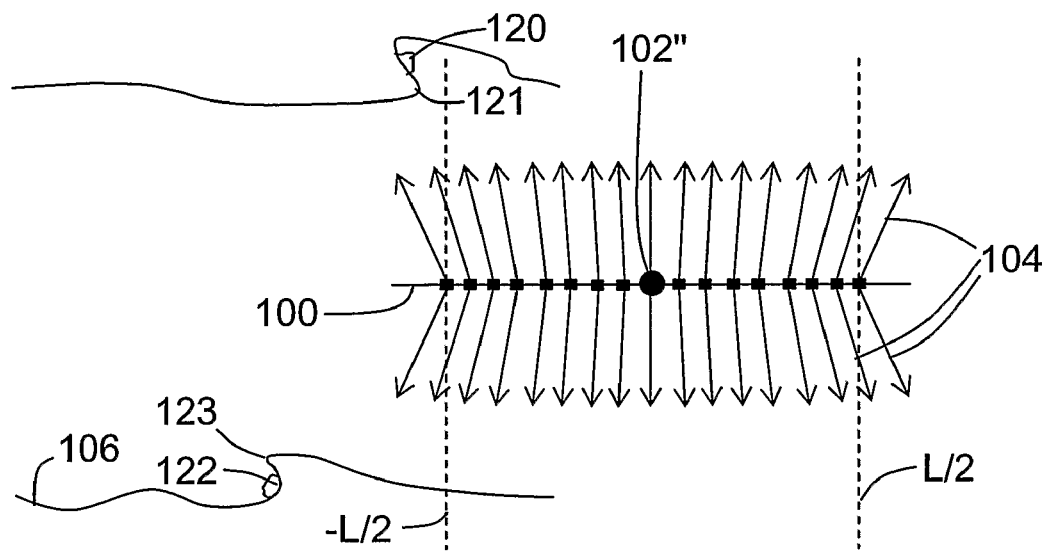

FIG. 6A diagrammatically shows a side view of the unfolding axis including ray casting directions and the surrounding lumen-defining surface, where the camera position has been shifted in the opposite direction along the lumen centerline versus FIG. 5A.

Figure 6B:
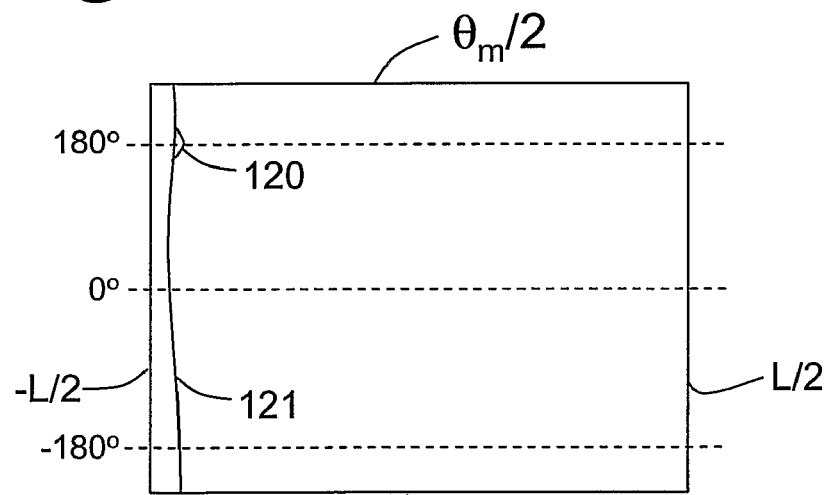

FIG. 6B diagrammatically shows the unfolded view obtained in the camera position of FIG. 6A.

Figure 7:
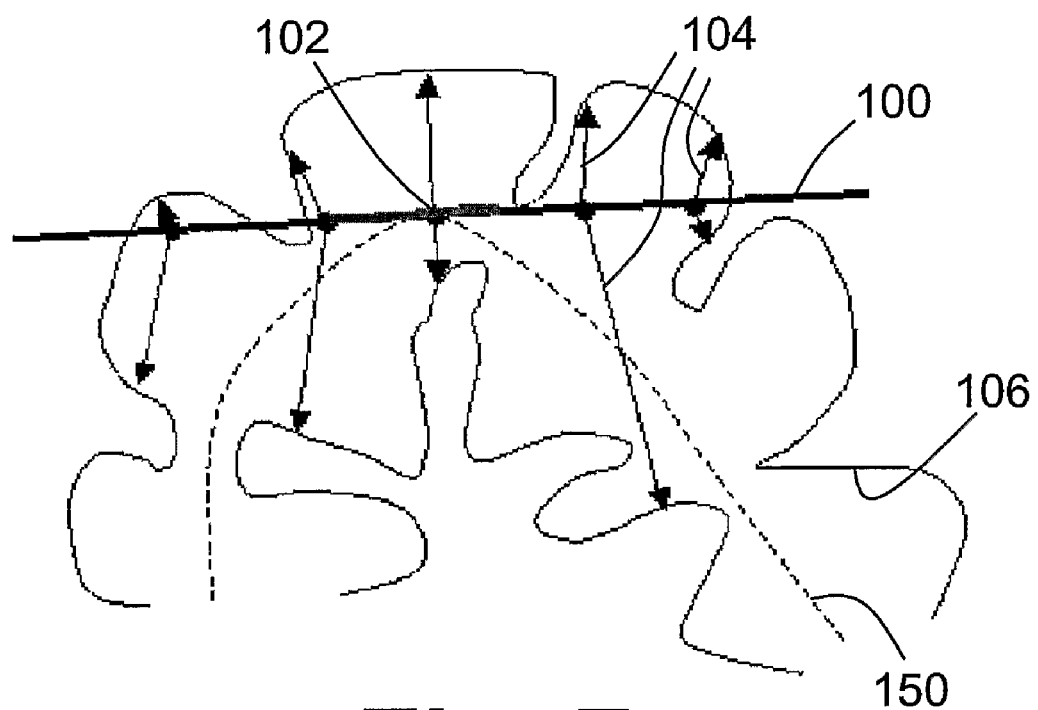

FIG. 7 diagrammatically shows a straight unfolding axis that is tangential to the lumen centerline at the camera position.

Figure 8:
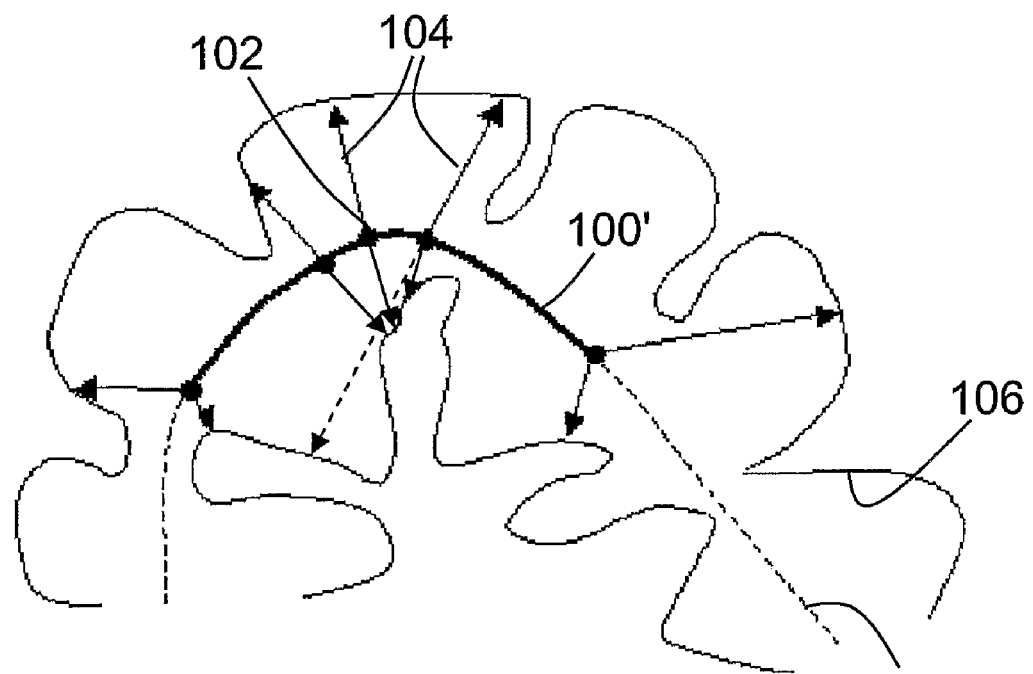

FIG. 8 diagrammatically shows a curved unfolding axis that coincides with a portion of the lumen centerline.

Figure 9:
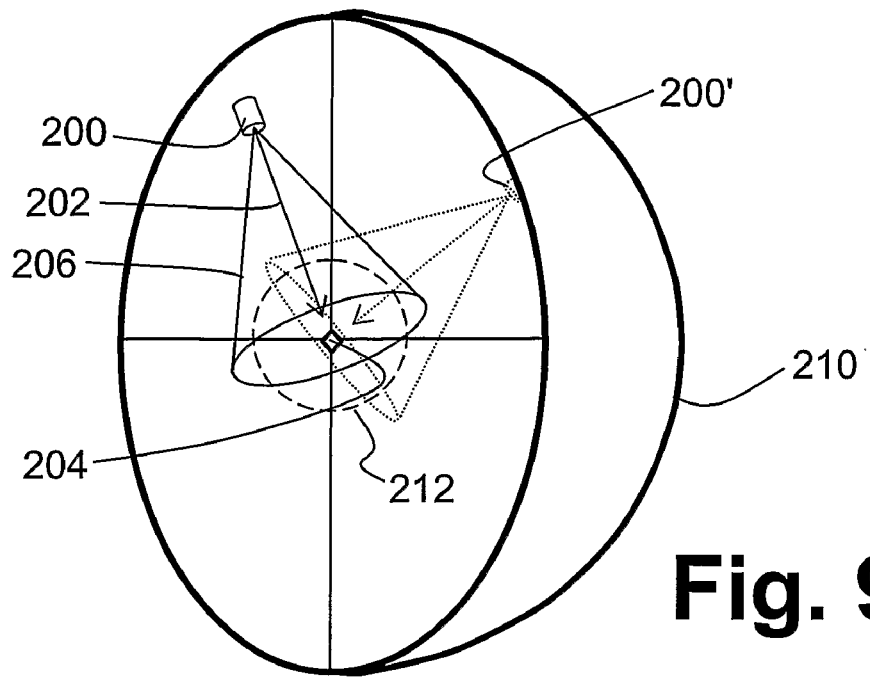

FIG. 9 diagrammatically shows the perspective endoscopic view geometry centered on an inspection position.

Figure 10:
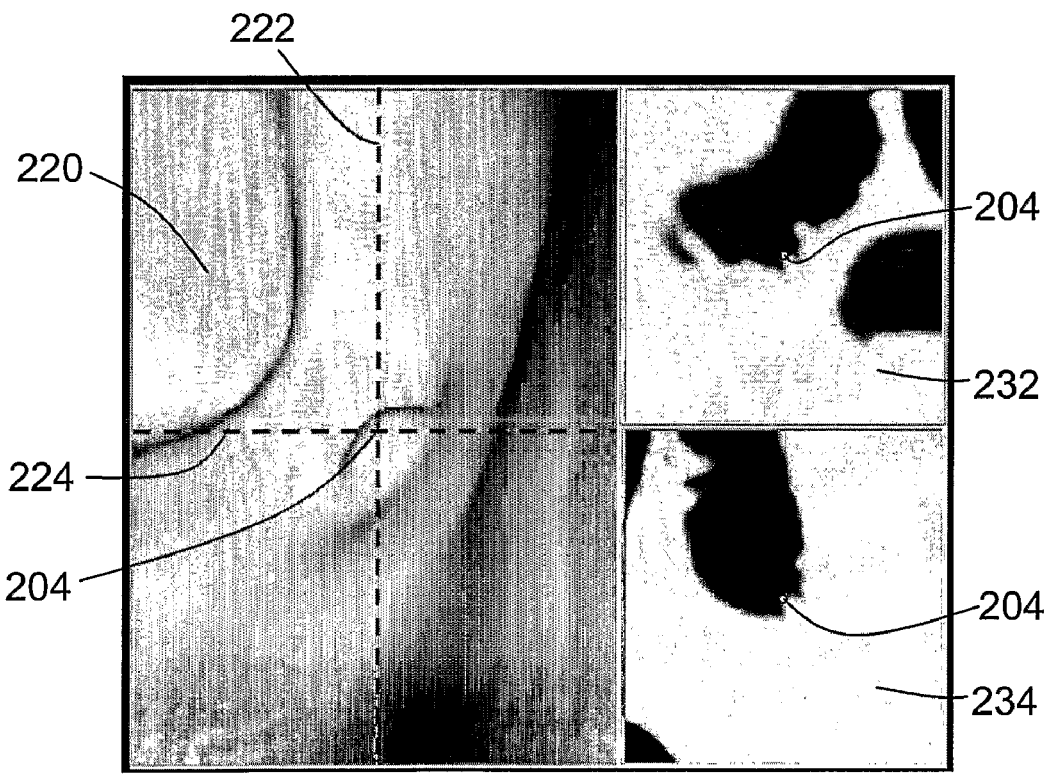

FIG. 10 shows an example perspective endoscopic view including two ancillary oblique views.

Figure 11:
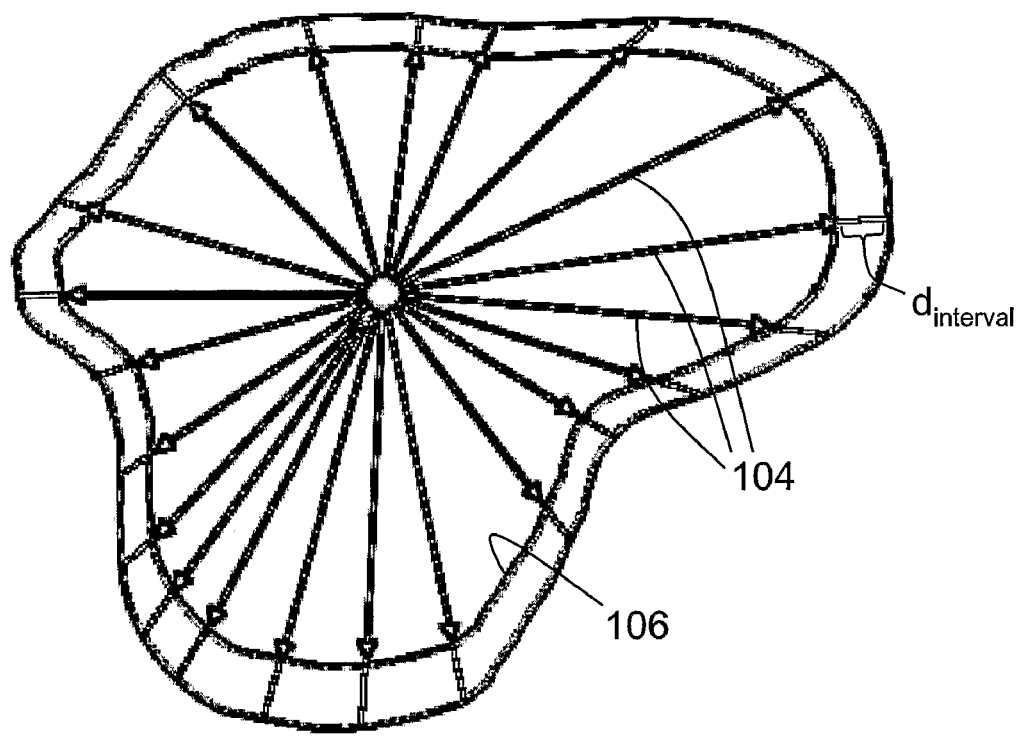

FIG. 11 diagrammatically shows an end view of ray casting computing a statistical characteristic over a selected interval ($d_{interval}$).

Figure 12:
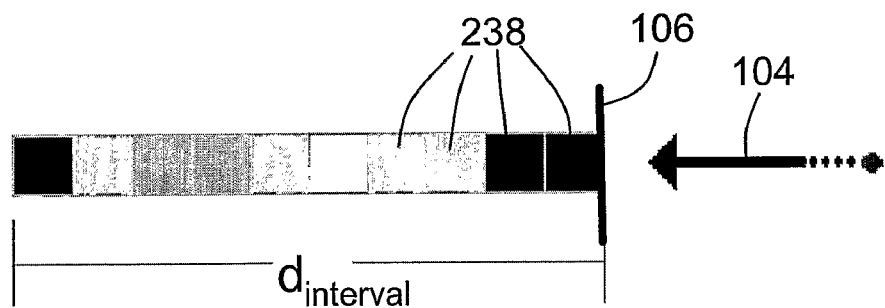

FIG. 12 diagrammatically shows the voxels over which the statistical characteristic is computed.

Figure 13:
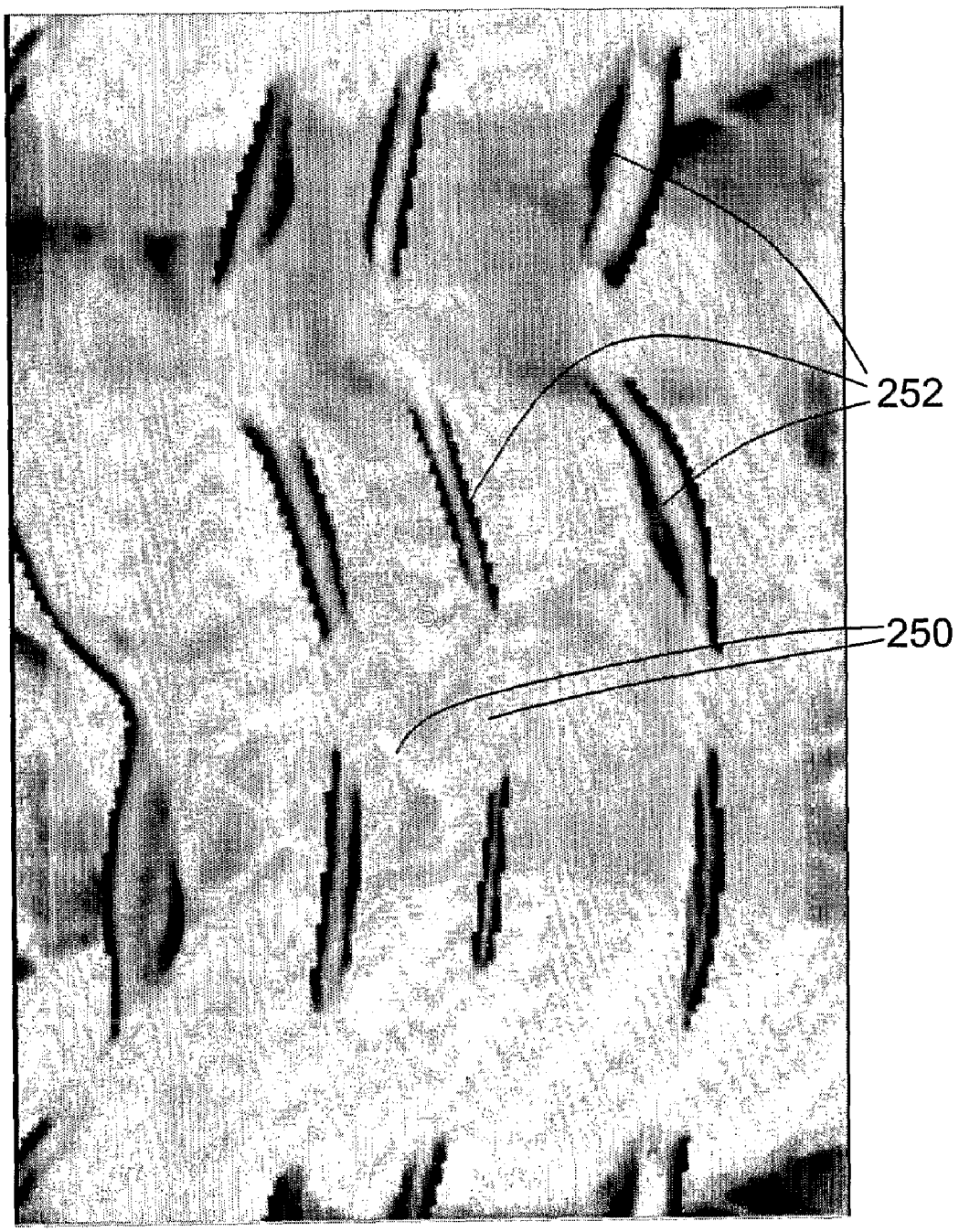

FIG. 13 shows an example grayscale unfolded view employing a MIP statistical characteristic and contrast enhanced imaging.

Figure 14A:
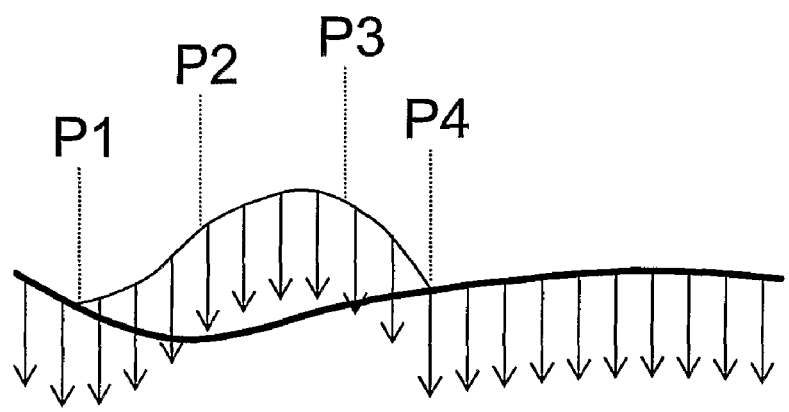

FIG. 14A diagrammatically shows ray casting employing a statistical characteristic, applied to a portion of a lumen-defining colon surface including an attached portion of stool material.

Figure 14B:
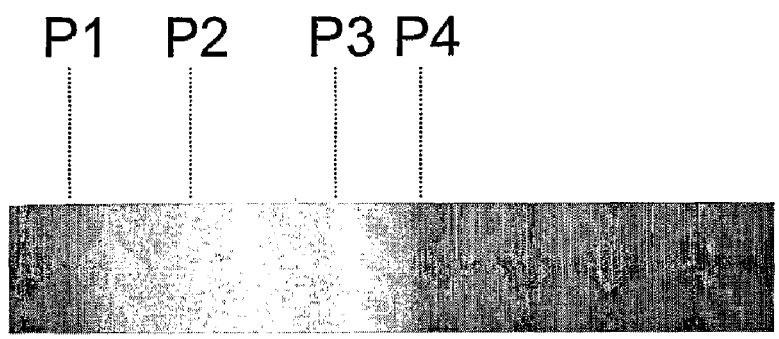

FIG. 14B diagrammatically shows a portion of a grayscale unfolded view corresponding to the colon lumen portion of FIG. 14A, where the statistical characteristic is an averaging of voxel values over the distance ($d_{interval}$).

Figure 14C:
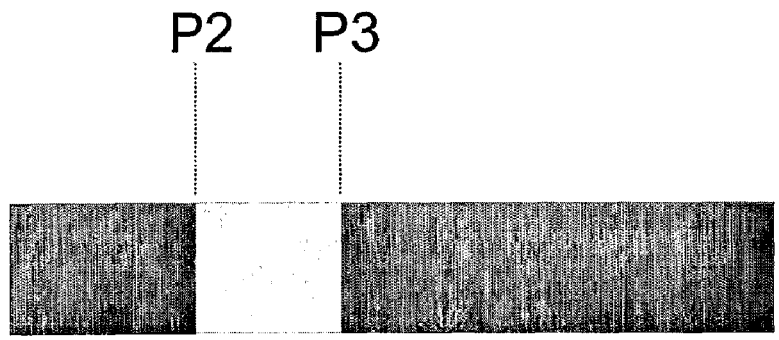

FIG. 14C diagrammatically shows a portion of a grayscale unfolded view corresponding to the colon lumen portion of FIG. 14A, where the statistical characteristic is a MIP over the distance ($d_{interval}$).

With reference to FIG. 1, a virtual endoscopy system includes a diagnostic imaging device, such as the illustrated computed tomography imaging scanner 10. The illustrated scanner 10 includes a cone-beam x-ray source 12 and a two-dimensional x-ray detector array 14 mounted on a rotating gantry 16 on opposite sides of an imaging region 20. (The x-ray source 12, detector array 14, and rotating gantry 16 are exposed in FIG. 1 for expository purposes; however, it will be appreciated that typically these components are enclosed in a stationary gantry housing). An endoscopy subject, such as a patient to be examined for cancer or irregularities of the colon, bladder, blood vessel, trachea, or other lumen-defining structure, a patient undergoing a general physical that includes colon cancer screening, or the like, is disposed on a patient support 22 and moved into the imaging region 20. Volumetric computed tomography data of the colon or other lumen-defining structure of interest are acquired using the scanner 10 and stored in a data memory 24. A reconstruction processor 26 employs filtered backprojection or another image reconstruction algorithm to reconstruct the acquired projection data into a volumetric image of the colon or other lumen-defining structure of interest, which is stored in a volumetric image memory 30.

It is to be appreciated that the illustrated computed tomography scanner 10 is an example, and can be replaced by another volumetric imaging system that is suitable for imaging the organ of interest. For example, a magnetic resonance imaging scanner may be suitably employed as the imager for certain virtual endoscopy procedures.

It is also to be appreciated that the patient or other imaging subject optionally undergoes one or more preparatory procedures before or during the endoscopic procedure. As an example, prior to a virtual colonoscopy procedure, the patient typically abstains from consumption of food and drink, and is given one or more medications that promote bowel movements, for a prescribed period prior to the virtual colonoscopy procedure, so as to substantially empty the large bowel of stool matter. A distention substance injector 34 fills the colon with a suitable distention substance that expands the colon during imaging. Suitable distention substances include, for example: room air administered via a tube inserted into the colon; pressure-controlled carbon dioxide; or water. Optionally, the distention substance includes a suitable contrast agent that enhances image contrast between the distended colon walls and the colon lumen. For example, when magnetic resonance imaging is employed to acquire the volumetric imaging data, a gadolinium-based contrast agent may be added to a water-based distention fluid for this purpose.

Certain virtual endoscopy procedures disclosed herein provide statistical information about tissue in a depth interval beyond the walls of the organ of interest, which can be useful in various ways. For example, such information can be used in virtual colonoscopy to distinguish stool material from polyps or other features of the colon walls. In other endoscopy procedures disclosed herein, an intravenous contrast agent injector 36 intravenously administers a contrast agent that enhances blood contrast; accordingly, wall-penetrating interval statistics provide information on the vasculature in the vicinity of the walls of the organ of interest, which can for example be useful in identifying and classifying certain malignant features.

The volumetric image of the colon or other organ of interest stored in the volumetric image memory 30 is processed by a centerline processor 46 which segments the image to distinguish the lumen of the colon or other organ of interest, and determines a centerline of the lumen. Substantially any volumetric image segmentation process can be used. In one suitable segmentation process, voxels corresponding to the lumen are identified as voxels which are transparent to x-rays or which have low x-ray opacity, while voxels corresponding to surrounding tissue are identified as voxels of higher x-ray opacity. After segmentation, the centerline processor 46 analyzes the segmented volumetric image to identify a selected trajectory such as a centerline along the colon or other organ of interest. Substantially any trajectory defining process suitable for identifying or defining the centerline or other trajectory through a generally tubular or elongated structure can be used. In some embodiments, the centerline is defined using an ordered sequence of voxel positions that follow the centerline. In other embodiments, the centerline is defined as an empirical equation or mathematical model fitted to the centerline of the segmented lumen. Information sufficient to define the centerline is stored in a centerline memory 48.

A virtual endoscopy processor 50 operating in conjunction with a graphical user interface 52 provides interactive virtual endoscopic imaging of the walls of the colon or other organ of interest. The user interactively manipulates the virtual endoscopic image to locate and inspect suspected polyps or other regions of interest. The endoscopic imaging can employ a perspective image that approximates in virtual space the familiar view of a physical endoscope camera investigating the colon or other organ of interest. Alternatively or additionally, the endoscopic imaging employs an unfolded or filet view in which the colon or other generally tubular or elongated organ of interest is longitudinally severed and laid open using a mathematical process. The pixels in such images are generated by simulating light reflected from the inner walls of the lumen to the virtual camera, creating a familiar surface reflectance image. In some procedures, the endoscopic imaging includes wall-penetrating interval information. In some procedures, inspection of suspected polyps or other regions of interest is performed in perspective view respective to an inspection position remote from the virtual camera. These features are examples—the virtual endoscopic imaging can incorporate various combinations of these features, and can incorporate additional or other features. In the illustrated embodiment, the graphical user interface 52 also communicates with a scanner controller 54 by which the user can operate the computed tomography imaging scanner 10. In other embodiments, a separate user interface is employed for operating the scanner.

While virtual colonoscopy is described herein as an illustrative example procedure, it is to be appreciated that the disclosed virtual endoscopic procedures can be more generally employed in conjunction with other partially hollow organs, body cavities, non-biological lumen-defining structures, and the like.

With continuing reference to FIG. 1 and with further reference to FIG. 2, an embodiment of the virtual endoscopy processor 50 is described. A virtual endoscopic procedure, such as a virtual colonoscopy, is typically performed to identify and inspect lesions, polyps, or other features whose presence and/or precise position or positions are unknown. Accordingly, the virtual endoscopy typically initially involves a survey of the lumen-defining surface. This survey is preferably performed using an unfolded or filet view. The unfolded view employs viewing rays distributed radially around and longitudinally along a straight or curved unfolding axis. The resulting image is converted to an unfolded representation of a portion of the lumen-defining surface.

Once a lesion, polyp, or other feature of interest is identified, the user typically wishes to inspect the feature more closely. Accurate feature inspection is difficult in the unfolded view, because the conversion of the three-dimensional lumen-defining surface into an unrolled generally flat surface introduces distortion. Accordingly, a perspective view of the feature of interest is constructed. The perspective view is from the vantage of an endoscopic camera looking at the feature of interest.

In constructing either an unfolded view or a perspective view, a plurality of ray casting directions are defined, and a ray casting processor 66 determines a suitable pixel value corresponding to each ray casting direction. In some virtual endoscopic imaging modes, the pixel values are light-reflectance volume rendered values generated by a rendering processor 68. The volume rendering incorporates a virtual lighting direction, a viewing direction defined by the ray casting direction, opacity mapping of the volumetric image voxels, gradient information, and the like. Such renderings provide a structural representation indicative of variations in surface orientation.

In other virtual endoscopic modes, the pixel values are statistical pixel values generated by a depth interval processor 70. The interval pixel values provide a statistical characteristic of voxels along the ray casting direction over an interval starting at an intersection between the ray casting direction and the lumen-defining surface and terminating a preselected distance along the ray casting direction into the lumen-defining structure. The lumen-defining surface may either be extracted and stored explicitly, or, more conveniently, may be detected implicitly during the ray casting operation itself, for example by using a threshold operating on either the data sample values or the magnitude of the local data gradient around the sampling location. The statistical characteristic can be, for example, a maximum or average voxel value within the interval. While the values provided by the rendering processor 68 are indicative of the lumen-defining surface, the statistical characteristic value provided by the interval processor 70 provides information on the contents of the data at layers below the surface. Regardless of which of the unfolded or perspective endoscopic imaging modes has been selected by the user, the ray casting processor 66 can provide rendered pixel values from the rendering processor 68, statistical characteristic pixel values from the interval processor 70, or some selected combination thereof.

The endoscopic image, which may be either an unfolded image or a perspective image, and which may employ rendering, statistical pixel values, or a selected combination thereof, is stored in a virtual endoscopic memory 76, and can be displayed and manipulated through the graphical user interface 52 via a virtual endoscopy user interfacing processor 78. In order to enable the user to select various endoscopic imaging modes, such as selection between the unfolded and perspective modes, selection of the pixel value mode, and so forth, the virtual endoscopy user interfacing processor 78 includes user-selectable virtual endoscopy parameters 80.

With continuing reference to FIG. 2 and with further reference to FIG. 3, the user-selectable virtual endoscopy parameters 80 include a ray casting mode 82 that selects rendering values, interval statistical values, or some combination thereof. An interval depth parameter 84 indicates the depth into the lumen-defining structure over which the interval processor 70 computes the statistical characteristic. A statistical characteristic function parameter 86 defines or indicates the statistical characteristic (for example, MIP or average pixel value). A view mode parameter 88 indicates whether unfolded or perspective endoscopic viewing is currently active. A camera position parameter 90 indicates a position of the camera in the perspective endoscopic imaging mode, and indicates a center of the unfolding axis in the unfolded or filet imaging mode.

In the unfolded imaging mode, an unfold-straight-or-on-centerline parameter 92 indicates whether the unfolding axis is straight or curved to coincide with a centerline of the lumen. An unfolding viewport length span parameter 94 indicates the length (L) of the unfolded view in the direction of the centerline, and an unfolding viewport angle span parameter 96 indicates an angular dimension ($\theta_m$) of the unfolded view in the unfolding direction. An unfolding perspective angle parameter 98 is also used in the unfolded or filet mode imaging disclosed herein. An inspection position parameter 99 relates to the position of a feature of interest in the image volume, and is used in certain perspective imaging modes disclosed herein.

In some viewing modes some of the user-selectable virtual endoscopy parameters 80 may be unused. For example, if the ray casting mode parameter 82 is set to pure rendering, then the statistical characteristic-related parameters 84, 86 are unused. Moreover, it is to be appreciated that the illustration herein of certain user-selectable parameters does not preclude inclusion of other user-selectable parameters. Furthermore, different or other user-selectable parameters may be used to perform the same functionality. As an example, the interval depth parameter 84 can be set to zero to indicate volume rendering, in which case the ray casting mode parameter 82 is suitably omitted. Still yet further, some user-selectable parameters may also have values set in an indirect or automated manner. For example, the camera position may be automatically incremented at a selected rate to provide automated fly-through imaging.

With reference to FIGS. 4A-4F, the unfolded view is produced by defining an unfolding axis 100 disposed about a camera position 102 and selecting a plurality of ray casting directions 104 (indicated by arrows) extending generally radially from the unfolding axis toward a lumen-defining surface 106 of the lumen-defining structure. For example, in virtual colonoscopy, the lumen-defining surface 106 may be the interior surface of the colon as imaged by the computed tomography scanner 10. In the approach illustrated in FIGS. 4A-4F, the unfolding axis 100 is divided into axis segments 110 each of which have a corresponding plurality of the ray casting directions 104 arranged generally radially symmetrically around the unfolding axis 100. This radial symmetry is best seen in FIG. 4A. Thus, each ray casting direction 104 can be designated by an unfolding axis coordinate along the unfolding axis 100 suitably denoted by the corresponding axis segment 110, and by an angular view coordinate θ (labeled in FIG. 4A) indicating the angular position of the ray casting direction around the unfolding axis 100.

In virtual colonoscopy and certain other virtual endoscopic procedures, the lumen-defining surface 106 is undulating and includes folds that can partially or completely obscure lesions, polyps, or other features of interest for certain viewing angles. For example, FIG. 4C shows a feature 120 disposed at θ=180° inside of a fold 121 of the lumen-defining surface 106. FIG. 4C also shows a feature 122 disposed at θ=−180° inside of a fold 123 of the lumen-defining surface 106. The folds 121, 123 obscure the features 120, 122 from being directly viewed along the ray casting directions 104 for the camera position 102.

To address this problem, the ray casting directions 104 are tilted away from the camera position 102 based upon distance between the corresponding axis segment 110 and the camera position 102. The tilting generally increases with increasing distance of the axis segment 110 away from the camera position 102, and intuitively corresponds to a "close-up" view of the unfolded surface. As best seen in FIG. 4B, in some embodiments the ray casting directions for a given axis segment 110 are all tilted the same amount, thus defining a cone of ray casting directions 104. Conceptually, the ray tilting approximates the lumen 106 being cut and flattened, and then inspected using a wide-angle camera with the camera position 102 at close proximity to the surface. The amount of ray tilting is determined by the unfolding perspective angle parameter 98 (see FIG. 3) and roughly corresponds to the closeness of the proximity of the camera position 102 to the unfolded surface (see FIG. 4F).

With reference to FIG. 4D, the unfolding or unrolling is performed from a starting angular coordinate of $-\theta_m/2$ to a terminating angular coordinate $-\theta_m/2$. In FIG. 4D, it is seen that the angular span $(-\theta_m/2, \theta_m/2)$ can be made greater than 360°, so that there is some repetition of the unrolled surface at the ends in the angular coordinate direction. For example, the angular width $\theta_m$ of the unfolded view may be 400°. This allows important structures, such as polyps, to appear undivided in the image even if they fall near the start or end of the unfolding angle range.

FIG. 4E shows a rendering of a portion of a colon surface using the unfolded or filet view. FIG. 4F diagrammatically illustrates the perspective view simulated by the unfolding process including ray tilting described herein. The unfolded view lies within a close-up perspective viewport 140 spanning an angular view coordinate range $(-\theta_m/2, \theta_m/2)$ and an unfolding axis view coordinate range $(-L/2, L/2)$. (In FIG. 4F the viewport 140 is indicated by dark lines). The unfolding centerline 100 and the camera position 102 are superimposed on the unfolded view of FIG. 4E. It will be noticed that to the right of the camera position 102, the left walls of the folds are visible, while to the left of the camera position 102 the right walls of the folds are visible. This is a consequence of the tilting of the ray casting directions shown in FIGS. 4A, 4B, and 4C. The perspective angle parameter 98 controls the amount of tilting. The relationship between the amount of tilting and the perspective is illustrated in FIG. 4F. Large amounts of tilting conceptually correspond to a close-up view of the surface (that is, camera position 102 close to the unfolding viewport 140), while lesser amounts of tilting conceptually correspond to a view of the surface from farther away (that is, camera position 102 far away from the unfolding viewport 140). To take advantage of the view perspective provided by the angular tilting to identify obscured lesions, polyps, or other features such as the features 120, 122, it is advantageous to move the camera position 102 along the centerline of the lumen. As the camera moves, the unfolding viewport 140 moves as well.

With reference to FIGS. 5A and 5B, the camera position 102 of FIG. 4C is moved to a new camera position 102' displaced some distance from the camera position 102 along the lumen centerline. As seen in FIG. 5A, in the camera position 102' some of the tilted rays are tilted to view into the fold 123 that obscures the feature 122 located at θ=−180°. Accordingly, the feature 122 becomes visible in the unfolded view (FIG. 5B) as the camera position is moved from camera position 102 to camera position 102'. However, the fold 121 still completely blocks view of the feature 120 at the camera position 102', and indeed the feature 120 does not lie within the viewport of the unfolded view of FIG. 5B.

Similarly, with reference to FIGS. 6A and 6B, the camera position 102 of FIG. 4C is moved to a new camera position 102" displaced some distance in the opposite direction from the camera position 102 along the lumen centerline. As seen in FIG. 6A, in the camera position 102" some of the tilted rays are tilted to view into the fold 121 that obscures the feature 120 located at θ=180°. Accordingly, the feature 120 becomes visible in the unfolded view (FIG. 6B) as the camera position is moved from camera position 102 to camera position 102".

As best seen in FIG. 4F, typically the length of the unfolding viewport 140 in the unfolding axis coordinate direction is substantially less than the total length of the colon or other lumen-defining structure, so as to provide a magnified view and so as to enable the camera position to be moved along the lumen centerline to shift the distortion of the unfolded lumen-defining surface. In some embodiments, the length L in the unfolding axis coordinate direction is a few centimeters.

With reference to FIG. 7, when the unfold straight or on centerline parameter 92 (see FIG. 3) is set to the straight mode, the unfolding axis 100 is straight and is tangent to a lumen centerline 150 of the lumen-defining surface 106 at the camera position 102. The straight unfolding axis geometry is a low distortion geometry. At sharp bends in the centerline 150, the straight unfolding axis geometry may have a limited field of view.

With reference to FIG. 8, when the unfold straight or on centerline parameter 92 (see FIG. 3) is set to the on-centerline mode, a curved unfolding axis 100' coincides a portion of with the centerline 150, which typically provides a larger field of view in the vicinity of sharp curves as compared with the straight unfolding axis geometry. At such curves, however, the tilted ray casting directions may overlap. Such overlaps can produce artifacts such as inversions and double features in the unfolded view. Angularly opposite the overlapping rays around the centerline, some regions may be undersampled and appear artificially compressed. To eliminate such problems, the relative tilting of adjacent ray casting directions 104 are adjusted to limit the relative angle between neighboring ray casting directions so as to prevent them from intersecting each other. Typically, the ray casting begins with ray casting directions at the center of the unfolding axis 100' near the camera position 102, and works outward away from the center. The ray casting directions are generally increasingly tilted with increasing distance from the camera position 102. However, where ray casting directions collide due to curvature of the unfolding axis 100', the tilting is adjusted to prevent overlap of ray castings within a preselected maximum ray casting distance. It should be appreciated that this restriction causes the radial symmetry axis of the rays at sharp bends to become non-collinear with the centerline tangent. Away from the bend, the symmetry axis realigns itself with the centerline tangent. This feature of the algorithm allows distortion of the appearance of surface features at sharp bends to be controlled, preventing excessive surface warping regardless of the tortuousness of the centerline path. The maximum angle allowed between neighboring ray casting radial axis directions increases with the degree of perspective indicated by the unfolding perspective angle 98 and within the preselected maximum ray casting distance.

With returning reference to FIGS. 2 and 3, the in the unfolded view mode the ray casting directions emanate from along the unfolding axis. However, the view mode 88 can also be set to perspective. Typically, the unfolded view mode is advantageous for performing a survey and identifying potential lesions or polyps, because: (i) the unfolded view mode provides a large field of view, and (ii) the distortion provided by the tilting of the ray casting lines provides a varying surface orientation as the camera position is moved along the lumen centerline, which can reveal features hidden by folds or other morphology of the lumen-defining surface. Once a feature of interest is identified, it is typically advantageous to switch over to perspective viewing mode. The perspective viewing mode reduces distortion and enables zooming in to see the feature more closely. In one suitable approach, a user operating in the unfolded viewing mode operates a pointer device such as a mouse, trackball, or the like, to point to and select one of the pixels of the unfolded view as an inspection position. The virtual endoscopy processor 50 then switches over to perspective mode by changing the setting of the view mode 88. The camera position parameter 90 initially remains the same as in the unfolded viewing mode, and the inspection position parameter 99 is set to position of the user selected pixel.

With reference to FIG. 9, a suitable perspective view geometry is described. A camera position 200 (stored in the camera position parameter 90) has a location and a viewing direction 202 directed toward an inspection position 204 (stored in the inspection position parameter 99). Additionally, the perspective view has a conical field of view 206 surrounding the viewing direction 202. The perspective view employs a cone of ray casting directions emanating from the camera position 200 and lying within the conical field of view 206. The ray casting processor 66 performs rendering along each ray casting direction to produce a perspective endoscopic view that is displayed.

The user can use the pointing device or another interfacing tool operating in the perspective endoscopic view to rotate the camera position 200 about the inspection position 204. For example, the user can rotate to an updated camera position 200' (drawn using dotted lines) where an updated perspective endoscopic view is constructed still looking with the inspection position 204 in the center of the field of view. During such rotation, the camera position remains on a spherical viewing surface 210 centered on the inspection position 204. Optionally, the user can also zoom in or out, which corresponds to changing the radius of the spherical viewing surface 210. The user may have other viewing options, such as changing the size of the conical field of view 206, or limiting the portion of the volumetric image which is viewed so as to having the inspection point 204 obscured by an intervening portion of the lumen-defining surface.

Optionally, the user can selectively segment the volume data, e.g. around a sphere 212 (indicated by a dashed circle in FIG. 9) or other shape. This permits the viewer to view the inspection position 204 from direction in which the lumen folds or other structure would otherwise obscure the viewing direction.

With reference to FIG. 10, in one suitable perspective endoscopic display, the perspective endoscopic view is shown in a main window 220, along with dashed lines 222, 224 indicating two orthogonal oblique views. The oblique view corresponding to the dashed line 222 is shown in a first ancillary oblique view window 232, while the oblique view corresponding to the dashed line 224 is shown in a second ancillary oblique view window 234. Each oblique view is parallel with the view line 202 connecting the camera position 200 and the inspection position 204. As the user updates the perspective endoscopic view by rotating the camera position 200 about the inspection point 204, the oblique views 232, 234 are also updated.

In either the unfolded view or the perspective view, the image can be generated by volume rendering along each ray casting direction performed by the rendering processor 68. The volume rendering suitably employs the ray casting direction as both the viewing direction and the illumination direction; alternatively, another illumination direction can be selected. The volume rendering also typically incorporates factors such as the opacity of the lumen-defining surface at the intersection with the ray casting direction, gradient information, and the like. Such renderings provide a structural representation indicative of variations in surface orientation. Alternatively, the user can select depth interval statistical pixel values through ray casting mode parameter 82.

With reference to FIGS. 11 and 12, the depth interval processor 70 (see FIG. 2) computes a statistical characteristic of voxels 238 along the ray casting direction 104 over an interval starting at an intersection between the ray casting direction 104 and the lumen-defining surface 106 and terminating a preselected distance ($d_{interval}$) along the ray casting direction 104 into the lumen-defining structure. The statistical characteristic can be for example a maximum or average voxel value of the voxels 238 within the interval depth ($d_{interval}$). If the maximum pixel value is used as the statistical characteristic, then the effect is to compute a maximum intensity projection (MIP) over the distance $d_{interval}$. The interval depth is user controlled by the interval depth parameter 84 (see FIG. 3).

The effect of the statistical characteristic is to provide internal information about the lumen-defining surface 106. In contrast, rendering generally provides surface orientation information, but does not provide internal information. The internal information provided by the statistical characteristic depends upon the specific lumen-defining structure.

With returning reference to FIG. 2 and with further reference to FIG. 13, one application of depth interval imaging is to image the vasculature underlying the lumen-defining surface. For example, in colonoscopy, irregularities in the vasculature near the colon surface can be indicative of malignant polyps. To image the vasculature, the intravenous contrast agent injector 36 administers a suitable contrast agent to enhance blood contrast. FIG. 13 shows an unfolded view of a contrast enhanced virtual colonoscopy employing MIP interval imaging. The vasculature appears as brighter regions 250 in the unfolded view. Darker streaks 252 correspond to folds of the colon surface.

With reference to FIGS. 14A-14C, another application of depth interval imaging does not employ an intravenous contrast agent. FIG. 14A shows the lumen-defining surface, which over most of the lumen is defined by a colon wall 260. However, a portion of stool 262 remains on a portion of the colon wall 260. Arrows 266 indicate the depth ($d_{interval}$) over which the statistical characteristic is computed. The locations labeled "P1" and "P4" indicate the lateral extent of the stool 262 along the colon surface. The locations labeled "P2" and "P3" indicate the lateral extent of the stool region 262 over which the stool is at least as thick as the interval depth ($d_{interval}$). FIGS. 14B and 14C show the corresponding portion of the unfolded view using a statistical average (FIG. 14B) and using a MIP (FIG. 14C), assuming that the stool material has a lower intensity than the colon material. In FIGS. 14B and 14C, the pixel intensity varies from white for lowest intensity to black for highest intensity.

As seen in FIG. 14B, when the statistical characteristic is an average pixel value, the contrast smoothly varies over the entire region between "P1" and "P4" that contains at least some stool material 262. The smooth contrast variation corresponds to smoothly changing thickness of the stool material 262.

As seen in FIG. 14C, when the statistical characteristic is a MIP, the contrast changes abruptly at the locations "P2" and "P3" where the interval depth is entirely contained within the stool 262. Inside the region bounded by locations "P2" and "P3", the MIP is performed entirely over voxels representing stool material. Outside the region bounded by locations "P2" and "P3", the MIP includes higher intensity voxels representing the colon wall, and so an abruptly higher MIP value results. Although not shown, it will be appreciated that if a minimum intensity projection is used as the statistical characteristic, then the contrast would abruptly change at the locations "P1" and "P4" inside of which the minimum intensity projection would include at voxels representing lower intensity stool material 262. Those skilled in the art can readily construct other suitable statistical characteristics. In the illustrated embodiment, the statistical characteristic function is stored in the statistical characteristic function parameter 86, which may contain a user-defined function.

While the illustrated depth interval image examples of FIGS. 13, 14B, and 14C are unfolded views, depth interval ray casting can also be used in the perspective endoscopic view. Moreover, while the illustrated examples of FIGS. 13, 14B, and 14C plot depth interval ray casting values as grayscale pixel values, the information can be used in other ways. For example, the depth interval ray casting information can be combined with volume rendering to provide an image containing both morphological (i.e., surface orientation) information and depth interval information. In one approach, the rendering processor 68 performs volume rendering for each ray casting direction to produce rendered voxel values representative of the surface orientation of the intersected lumen-defining surface. Each rendered voxel value is adjusted based on a depth interval statistical characteristic computed by the depth interval processor 70 to incorporate depth information into the volume rendering. For example, the volume rendering may be monochromatic in color, and the depth-based adjustment may adjust the voxel color of the rendered voxels based on the computed statistical characteristic.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. A virtual endoscopy method for performing virtual endoscopy on a volumetric image of a lumen-defining structure having an elongated lumen, the method comprising:
   determining an unfolding axis substantially within the elongated lumen and generally positioned at a camera position, the unfolding axis being divided into axis segments;
   selecting ray casting directions extending generally radially from the axis segments of the unfolding axis;
   tilting, via a processor, at least some of the ray casting directions away from the camera position based on distance between the corresponding axis segment and the camera position;
   performing, via the processor, ray casting along the tilted ray casting directions to define pixel values; and
   arranging, via the processor, the pixel values into an unfolded view,
   wherein a pixel value defined by a tilted ray from a particular axis segment captures information about the lumen that is not captured by a pixel value defined by a non-tilted ray from the same particular axis segment.

2. The virtual endoscopy method as set forth in claim 1, wherein the ray casting directions corresponding to each axis segment are arranged radially symmetrically around the unfolding axis.

3. The virtual endoscopy method as set forth in claim 1, wherein the tilting generally increases with increasing distance of the axis segment from the camera position.

4. The virtual endoscopy method as set forth in claim 1, wherein the ray casting has a preselected maximum ray casting distance, and the tilting is adjusted to prevent overlap of ray castings within the preselected maximum ray casting distance.

5. The virtual endoscopy method as set forth in claim 1, wherein the amount of tilting is controlled by a user-selected unfolding perspective angle parameter.

6. The virtual endoscopy method as set forth in claim 1, wherein, for each axis segment, the tilting of the ray casting directions corresponding to the axis segment are identical, the tilted ray casting directions of the axis segment defining a cone of ray casting directions.

7. The virtual endoscopy method as set forth in claim 1, wherein the information includes a feature in a fold in the lumen.

8. The virtual endoscopy method as set forth in claim 1, further including:
   moving the camera position to an updated camera position; and repeating the determining of an unfolding axis, the selecting of ray casting directions, the tilting of the ray casting directions, the performing of ray casting, and the arranging of the pixel values to produce an updated unfolded view for the updated camera position.

9. The virtual endoscopy method as set forth in claim 1, further including:

defining an inspection position corresponding to a structure of interest in the unfolded view;

constructing a perspective endoscopic view having (i) the camera position and (ii) looking at the inspection position;

fixing the inspection position as the center of a sphere;

in response to a user input, rotating the camera position along the surface of the sphere; and constructing a rotated perspective endoscopic view having (i) an updated camera position rotated based on the user input and (ii) looking at the inspection position.

10. The virtual endoscopy method as set forth in claim 9, wherein the defining of an inspection position includes:

receiving via user interaction with the unfolded view a user selection of one of the pixels of the unfolded view, the position of the selected pixel being the inspection position.

11. The virtual endoscopy method as set forth in claim 9, further including:

displaying simultaneously with the perspective endoscopic view two orthogonal oblique views, each oblique view being parallel with a line connecting the camera position and the inspection position; and displaying simultaneously with the rotated perspective endoscopic view two updated orthogonal oblique views, each updated oblique view being parallel with a line connecting the updated camera position and the inspection position.

12. The virtual endoscopy method as set forth in claim 9, wherein the perspective endoscopic views include less than the entire volumetric image so as to avoid obstructing the camera view of the inspection point.

13. The virtual endoscopy method as set forth in claim 1, wherein the performing of ray casting along each ray casting direction to define a pixel value corresponding to each ray casting direction includes:

performing volume rendering along the ray casting directions, the volume rendering employing the ray casting directions as illumination direction parameters.

14. The virtual endoscopy method as set forth in claim 1, wherein the performing of ray casting includes:

identifying an intersection of the ray casting direction and a lumen-defining surface of the lumen-defining structure; and computing a statistical characteristic of voxels over a preselected distance along the ray casting direction into the lumen-defining structure.

15. The virtual endoscopy method as set forth in claim 14, wherein the statistical characteristic is one of a maximum intensity projection and an average value of voxels over the preselected distance along the ray casting direction into the lumen-defining structure.

16. The virtual endoscopy method as set forth in claim 13, wherein the performing of ray casting along each ray casting direction to define a pixel value corresponding to each ray casting direction further includes:

performing volume rendering for the ray casting directions to produce rendered voxel values representative of the intersected lumen-defining surface; and adjusting the rendered voxel values based on the computed statistical characteristics.

17. The virtual endoscopy method as set forth in claim 16, wherein the adjusting of the rendered voxel value includes color adjustment of the rendered voxel values based on the computed statistical characteristics.

18. The virtual endoscopy method as set forth in claim 13, wherein the lumen-defining structure is an anatomical organ, the virtual endoscopy method further including:

prior to acquiring the volumetric image of the anatomical organ, administering an intravenous contrast agent providing enhanced vascular contrast in the volumetric image.

19. The virtual endoscopy method as set forth in claim 1, wherein the volumetric image of the lumen-defining structure is a volumetric computed tomography image of an organ selected from the group consisting of a colon, a bladder, a blood vessel, a trachea, and an intestine.

20. The virtual endoscopy method as set forth in claim 1, wherein the tilted rays currently extend from a plurality of different axis segments.

* * * * *